March 1, 1949.  M. F. SKINKER  2,462,911
RECTIFIER
Filed Oct. 20, 1945
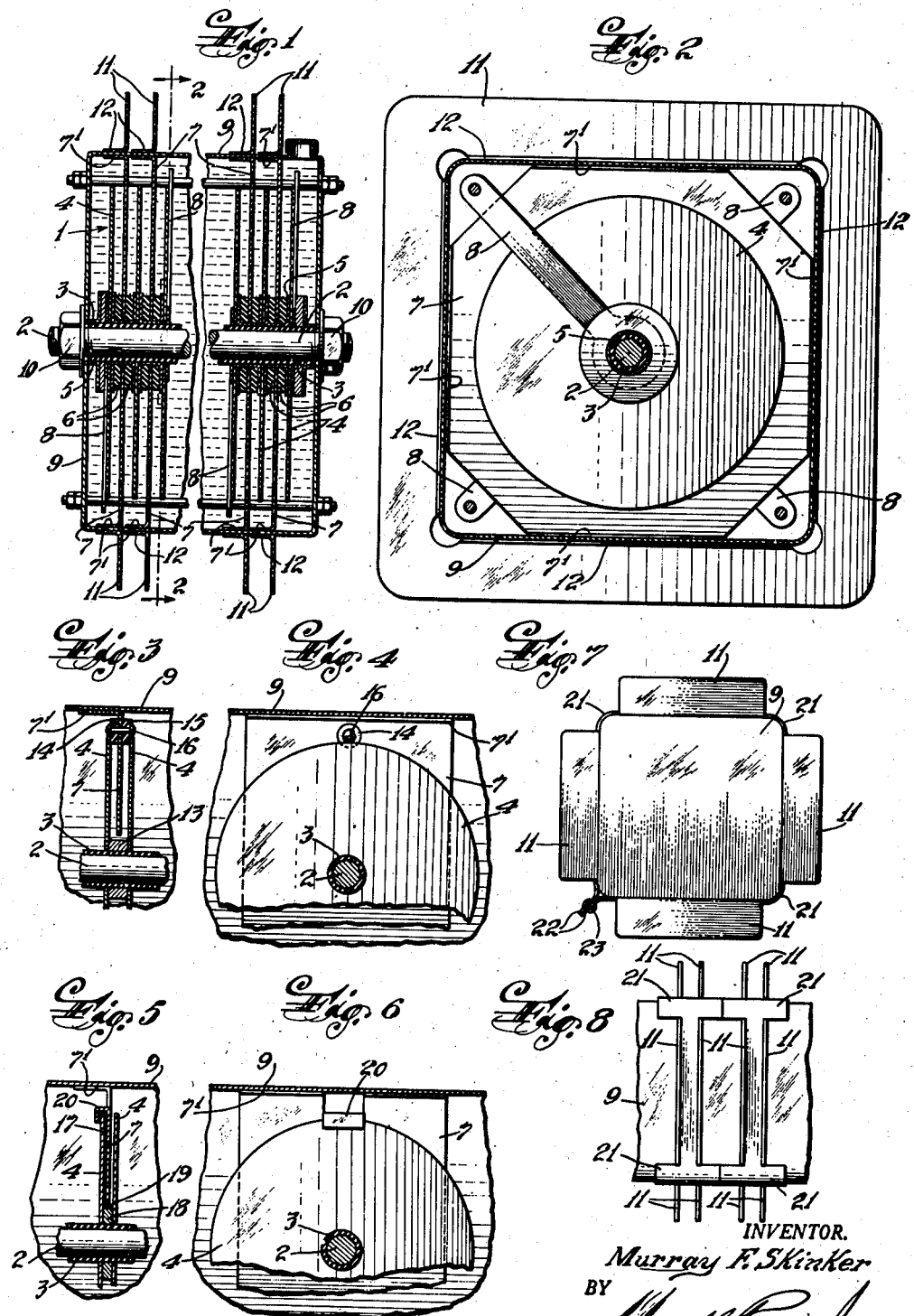
INVENTOR.
Murray F. Skinker
BY
ATTORNEY Patented Mar. 1, 1949

2,462,911

UNITED STATES PATENT OFFICE 2,462,911

RECTIFIER

Murray F. Skinker, Montclair, N. J., assignor to Federal Telephone and Radio Corporation, Newark, N. J., a corporation of Delaware Application October 20, 1945, Serial No. 623,561

3 Claims. (Cl. 175—366)

The present invention relates to arrangements for cooling rectifiers, particularly those which are mounted in closed housings or cans.

The dangers and limitations of heat development during the operation of rectifiers has been recognized before, and means have been provided to dissipate the heat formed during operation of the rectifier. One of such means are fins each arranged next to one or a plurality of rectifier discs in a stack.

Difficulties arose in such cases where the rectifier stacks had to be mounted in closed housings or cans in order to protect them from the atmosphere and it is the main object of the present invention to provide means for cooling rectifier stacks of this type.

It is another object of the present invention to provide cooling means not only for the rectifier stack, but also for the housing or cans containing the rectifier stack.

With these and other objects in view the present invention will become apparent and clearly understood in connection with the accompanying drawings, in which:

Figure 1 is a partial longitudinal sectional view through a rectifier stack mounted in an enclosed housing;

Fig. 2 is a sectional view along the lines 2—2 of Fig. 1;

Fig. 3 is a longitudinal sectional view of another embodiment of mounting the cooling fins arranged inside of the housing;

Fig. 4 is a sectional view along the lines 4—4 of Fig. 3;

Fig. 5 is a partial longitudinal sectional view of still another embodiment of arranging the cooling fins inside the housing;

Fig. 6 is a sectional view along the lines 6—6 of Fig. 5;

Fig. 7 shows an end view of the arrangement of mounting the outer cooling fins on the housing containing the rectifier stack; and Fig. 8 is a front view of the arrangement shown in Fig. 7.

Referring now to the drawings, Figs. 1 and 2 disclose one embodiment of mounting the inner cooling fins in the rectifier stack. The rectifier stack 1 comprises in usual manner a central bolt 2 which is surrounded by an insulating tube 3. A number of rectifier discs 4 are stacked on the insulating tube 3 and each disc 4 is spaced from the next adjacent disc by a metal ring 5 having flange-like extensions at both ends, thereby providing series connection between adjacent discs. Two insulating washers 6 are inserted into the ring 5 and a preferably squarely shaped inner fin 7 mounted between the two washers 6. The outer ends 7' of the fins 7 are bent over for about 90° along the inner face of housing 9 in order to provide a spring-like support for the fins on the inner side of the housing 9 containing the entire rectifier stack. A predetermined number of rectifier discs 4 with cooling fins 7 arranged between them, and lugs 8 as terminals for a predetermined number of rectifiers are mounted to a stack in the housing 9, which stack is kept in position by a nut 10 screwed on the bolt 2. The housing 9 is then filled up with any heat dissipating liquid medium, preferably oil, which greatly increases the heat conductivity to the housing 9.

In order to assure further heat dissipation from the housing 9 a number of preferably squarely shaped outer fins 11 are provided on the outside of the housing 9, each fin being on its inner end bent over about 90° along the outer surface of the housing 9 to an extension 12 which keeps each one of the fins 11 by a spring-like action in its position.

Whereas Figs. 1 and 2 disclose one embodiment of mounting of the fins, Figs. 3 and 4 show a different embodiment of such mounting. According to this second embodiment a washer 13 is arranged between each pair of adjacent rectifier discs 4. One inner cooling fin 7 is arranged between each pair of adjacent rectifier discs 4. The outer ends 7' of the fins 7 are again bent over about 90° along the inner surface of the housing 9 in order to insure a spring-like action against the housing 9 thus retaining each fin 7 in its proper position. Preferably two pairs of insulating washers 14 and 15 in opposite arrangement are provided near the outer end of the discs 4 which are adapted to space the discs 4 from the fin 7 and to retain the latter in position. The fins 7 are equipped with a center hole of larger diameter than that of the washers 13 in order to avoid electric contact between the two elements. A rivet 16 or eyelet or the like penetrating the two washers and the fin 7 keeps the washers in proper position.

Figs. 5 and 6 of the drawing discloses still a further embodiment of the mounting of the inner fin 7 in the rectifier stack. The fin 7 is provided in this construction on one side with an insulating layer 17, since in accordance with this construction the inner cooling fin 7 is arranged very close to the disc 4. A metal washer 18 is provided between each pair of adjacent discs 4. The fin 7 is positioned around the washer 18, however, due to a center hole 19 in the fin 7 of larger diameter than the outer diameter of the washer 18 a contact between the washer 18 and the fin 7 is avoided. The outer end 7' of the fin 7 is again bent over for about 90° along the inner face of the housing 9 in order to retain the fin 7 in its proper position. A part of the inner fin 7 close to the outer end of the disc 4 is cut out and bent over about 180° in order to form a U-shaped end 20 for a part of its width. The leg of the U-shaped end 20 is kept short, so that no contact with the counter-electrode can occur. Thus the U-shaped end 20 covers a selenium covered portion of the margin of the disc 4, the latter thereby contributing in keeping the inner fin 7 in its proper position.

It is to be understood that Figs. 3, 4 and 5, 6, respectively, show two further embodiments of the arrangements of the inner fin and though no outer fins are shown in these figures, such outer fins can be provided as disclosed in Figs. 1, 2 or 7 and 8.

Figs. 7 and 8 show a particular construction of outer fins made of sheet metal. In order to provide the outer fins in accordance with Figs. 7 and 8 a sheet metal strip is first bent to U-shaped cross-section and then bent three times for 90° at a distance conforming with the height and the width of the housing 9, thereby surrounding this housing on all four sides as clearly shown in Fig. 7. Before the bending operation takes place several upwards extending portions of the U-strip are cut on proper places and turned back to the base of the U thereby providing a number of sideward extensions 21 which serve as spacing means between two adjacent outer fin strips 11. The sideward extensions are arranged at such a distance in the U-shaped strip that upon bending the strip they cover three corners of the housing 9. The two ends of the strip, where also side extensions 21 are provided, are bent outside for about 45° and form thereby parallel extending ends 22 which can be connected by a rivet 23 or the like. Thus each one of the strips surrounding the housing 9 and forming the outer fins 11 is retained in proper position.

While I have disclosed the principles of my invention in connection with several different embodiments, it will be understood that these embodiments are given by way of example only and not as limiting the scope of the invention as set forth in the objects and the appended claims.

What I claim is:

1. In a rectifier stack, a center bolt, a plurality of rectifier discs and inner cooling fins mounted on said bolt, and a housing surrounding said discs and fins, one of said inner cooling fins being arranged between each pair of adjacent rectifier discs, a ring having flanges between each one of said discs, two washers of insulating material in said ring, said cooling fin held between said washers, the outer end of said fin bent over for about 90° and extending along the inner face of said housing.

2. In a rectifier stack, a center bolt, a plurality of rectifier discs and inner cooling fins mounted on said bolt, and a housing surrounding said discs and fins, one of said inner cooling fins being arranged between each pair of adjacent rectifier discs, a pair of washers between said discs, said fin being arranged between said washers, the outer end of said fin bent over for about 90° and extending along the inner face of said housing and at least two pairs of washers arranged on both sides of said fin near the margin of said discs, said last mentioned washers adapted as spacing means for each pair of adjacent discs.

3. In a rectifier stack, a center bolt, a plurality of rectifier discs and inner cooling fins mounted on said bolt, and a housing surrounding said discs and fins, one of said inner cooling fins being arranged between each pair of adjacent rectifier discs, a metal washer arranged between said pair of discs, a fin positioned around said washer, said fin having a center hole of larger diameter than that of said washer, an insulating layer on one side of said fin, the outer end of said fin bent over about 90° and extending along the inner face of said housing, one portion of said fin near its outer end cut out and bent over twice for about 90° in order to form a U-shaped part surrounding the margin of the said disc.

MURRAY F. SKINKER.

REFERENCES CITED

The following references are of record in the file of this patent:

UNITED STATES PATENTS

| Number | Name | Date |
|---|---|---|
| 1,051,481 | Bradley | Jan. 28, 1913 |
| 1,504,002 | Thompson | Aug. 5, 1924 |
| 2,288,341 | Addink | June 30, 1942 |
| 2,326,151 | Marbury | Aug. 10, 1943 |
| 2,349,629 | Lazich | May 23, 1944 |

FOREIGN PATENTS

| Number | Country | Date |
|---|---|---|
| 51,318 | Netherlands | Sept. 16, 1941 |
| 693,239 | Germany | July 6, 1940 |